United States Patent [19]

Gachet et al.

[11] Patent Number: 4,919,176
[45] Date of Patent: Apr. 24, 1990

[54] RAMPED DEVICE FOR FINITE POSITIONING OF PANEL JOINT FORMING TOOL

[75] Inventors: Benton W. Gachet; Dennis C. Hunstman; Matthew G. Popik; Robert W. Taylor, all of Jackson, Tenn.

[73] Assignee: Porter Cable Corporation, Jackson, Tenn.

[21] Appl. No.: 339,001

[22] Filed: Apr. 17, 1989

[51] Int. Cl.$^5$ .............................................. B23C 1/20
[52] U.S. Cl. ......................... 144/134 D; 144/136 C; 409/182
[58] Field of Search ....................... 409/136, 180, 182; 144/134 D, 136 C

[56] References Cited

U.S. PATENT DOCUMENTS 4,416,340 11/1983 Bailey .
4,551,047 11/1985 Price ............................ 144/134 D
4,606,684 8/1986 Shaturov et al. .
4,632,609 12/1986 Johne .
4,642,005 2/1987 Kondo et al. .
4,669,933 6/1987 Dye .
4,674,162 6/1987 Wheeler .

Primary Examiner—W. Donald Bray
Attorney, Agent, or Firm—Merchant, Gould, Smith, Edell, Welter & Schmidt

[57] ABSTRACT

An assembly for facilitating the cutting of matching panel joints includes a base body which is adapted to be secured to the lower surface of a router or the like and has a lower ramped slide surface defined therein, and a slide member having a topped ramped bearing surface defined therein for contacting the lower ramped slide surface in the base body. The base body and slide member are mounted for sliding relationship relative to each other so that a lower bearing surface on the slide member is vertically adjustable relative to a corresponding lower bearing surface on the base body. In operation, the base body and slide member are adjusted so that their respective bearing surfaces differ in elevation to a degree equal to one-half the wavelength of a cutting bit to be used in the router. In this way, a first cut may be effected by using the bearing surface in the base body, and a complementary second cut may be formed by using the bearing surface on the slide member, without the need for readjustment of the assembly between cuts.

10 Claims, 2 Drawing Sheets

RAMPED DEVICE FOR FINITE POSITIONING OF PANEL JOINT FORMING TOOL

BACKGROUND OF THE INVENTION

1. Field of the Invention

The present invention relates to positioning devices for wood-working, solid surfacing and laminate tools. More specifically, the present invention relates to a unique finite positioning device for a panel joint forming tool which permits a router or like rotary cutting tool to cut matching and mating grooves in a pair of panels without readjustment between cuts.

2. Description of the Prior Art

In order to form matching and mating grooves in opposing panels or other elements to be joined, it is necessary for the cuts on opposing elements to be formed one-half a wavelength out of phase with each other so that a proper dovetail type fit can be achieved. When making such cuts with a hand router assembly or like cutting tool, it is heretofore been necessary to adjust the position of the router bit relative to the router base between cuts, or to use a second router in order to make a second cut, both of which processes being relatively time-consuming and inefficient. In addition, such methods were often imprecise, because of gradual shifting of the router bit level relative to the remainder of the router during operation.

It is clear that there has existed a long and unfilled need in the prior art for a panel joint forming tool which is compatible with a standard router and is capable of making or facilitating dovetail type interlocking cuts for opposing panel joints without repositioning of the router bit relative to the remainder of the assembly between cuts.

SUMMARY OF THE INVENTION

Accordingly, it is an object of the invention to provide a panel joint forming assembly that is capable of making interlocking cuts for matching panel joints, is compatible with a standard router, and which does not require repositioning of the router bit relative to the remainder of the assembly between cuts.

In order to achieve the above and other objects of the invention, an assembly for cutting matching panel joints is provided including a router having a lower surface, a motor, a shaft connected to the motor and an elongate cutting bit connected to rotate with the shaft; the cutting bit having a cutting shape which repeats periodically along its length; a base body having a top surface secured to the router lower surface in the lower ramped slide surface extending at a first angle with respect to the top surface; a slide member having a top ramped bearing surface which contacts the lower ramped slide surface for sliding movement therebetween, and a lower bearing surface adapted for contacting a work piece, the top ramp bearing surface extending at a second angle with respect to the lower bearing surface that is equal to the first angle; and structure for releasably securing the slide member at a selected position with respect to the base body, whereby the position of the lower bearing surface may be adjusted with respect to the cutting bit.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT(S)

Figure 1:
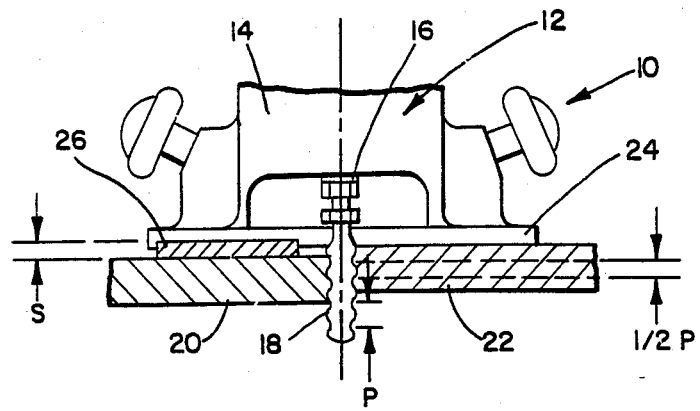
FIG. 1 is an operational view of an assembly constructed according to a preferred embodiment of the invention, with a pair of workpieces being shown in cross section.

Referring to the drawings, wherein like references numerals depict corresponding structure throughout the views, and referring in particular to FIG. 1, a panel joint forming apparatus 10 constructed according to the preferred embodiment of the invention includes a router 12 having a body portion 14 and an output shaft 16 which is securable to a router bit 18. Router bit 18 is provided with a wave form cutting shape of the type normally used to form sine wave type interlocking cuts in separate work pieces which are intended to be joined. In router bit 18, a wavelength is defined as the distance between adjacent crests in the profile of the cutting bit 18. Accordingly, as is illustrated in FIG. 1, a distance of one-half a wavelength corresponds to the length on bit 18 between a crest on the bit profile to a distance equal to half the length to an adjacent crest, which usually corresponds to the most recessed portion of the cutting bit profile. In order to make matching sine wave type interlocking joints, it is necessary to effect a cut on a second work piece 22 that is one-half wavelength out of phase with a cut made on a first work piece 20 so that the resulting cuts on the two work pieces 20, 22 to be joined physically complement each other. Although FIG. 1 illustrates both workpieces in positions adjacent each other, it is to be understood that the preferred method is to groove each separately from the other. In the present invention, such cuts are made possible without adjustment of router bit 18 relative to the router base body 24 between cuts by a novel adjustable router base assembly 24.

Figure 4:
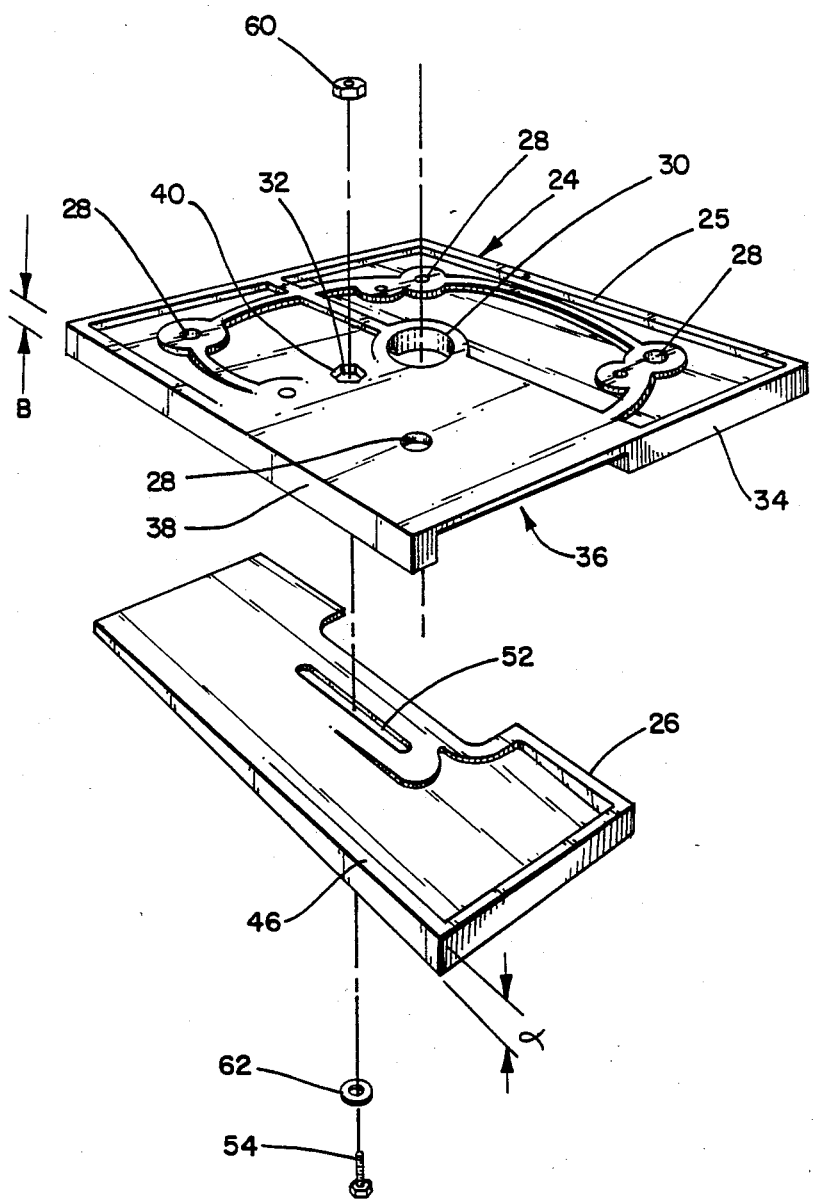
FIG. 4 is an exploded assembly view of the base assembly illustrated in FIGS. 2 and 3.

In the preferred embodiment, router base assembly 24 includes a router base body 25 and a router base slide member 26 which is formed so as to slide relative to router base body 25. Referring briefly to FIG. 4, router base body 25 is provided with a plurality of router mounting holes 28 which permit base body 25 to be secured to the lower surface of router base body 24 through a plurality of mounting screws or the like, in a manner that is known throughout the mechanical arts. Router base body 25 is further provided with a router bit access opening 30 which permits router bit 18 to extend therethrough. Further formed in the top surface of base body 25 is a hexagonally shaped adjustment bolt hole 32, the purpose of which will be further described below. Referring again to FIG. 4, base body 25 includes a flat block portion 34 and a second portion having a recess 36 defined in a lower surface thereof. Recess 36 is defined by a sidewall in flat block portion 34, a sidewall 38 and a lower, ramped slide surface 42 which is defined in a lower portion of router base body 25. Flat block portion 34 is provided with a bottom bearing surface 44 for guiding assembly 10 when effecting a cut on a second work piece 22, in the manner which is illustrated in FIG. 1 which will be described further below.

Figure 2:
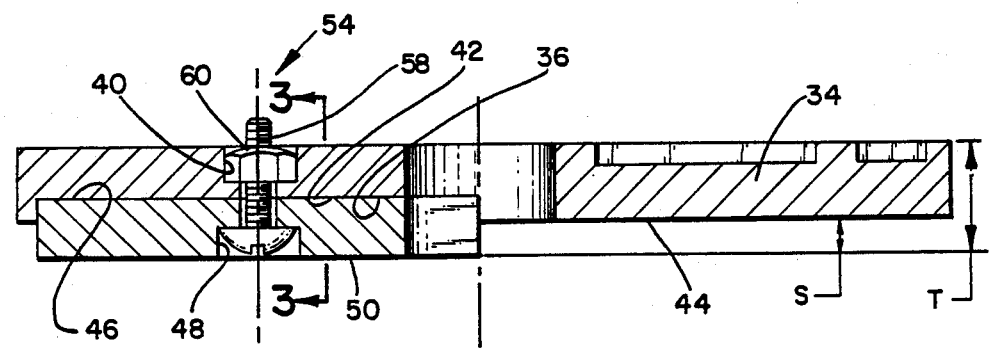
FIG. 2 is a cross sectional view through a portion of a base assembly in the embodiment illustrated in FIG. 1.
Figure 3:
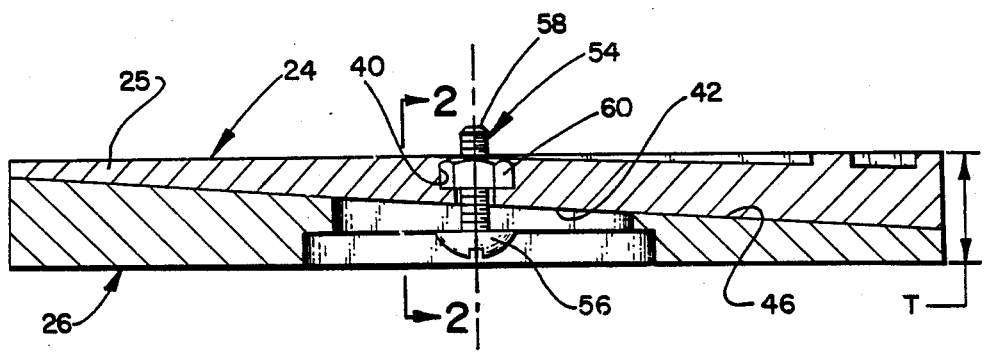
FIG. 3 is a cross sectional view of the base assembly taken along lines 3—3 in FIG. 2.

Referring now to FIGS. 2, 3 and 4 base slide member 26 is provided with a ramped bearing surface 46 which is adapted to bear against the ramped slide surface 42 formed in router base body 25. Base slide member 26 is additionally provided with a lower bearing surface 50 for supporting assembly 10 during cutting of first work piece 20, as is illustrated in FIG. 1. In the preferred embodiment, ramped bearing surface 46 is angularly disposed at an angle $\alpha$ relative to bearing surface 50. Likewise, ramped slide surface 42 in router base body 25 is angularly disposed at an angle $\beta$ relative to bearing surface 44 that is identical to the angle $\alpha$, but is tilted in an opposite direction so that the bearing surfaces 44, 50 will be parallel to each other when ramped bearing surface 46 is urged against ramped slide surface 42.

Referring now to FIG. 2, router base slide member 26 is provided with a bolt head receiving recess 48 which receives the head portion of a machine bolt 54. Machine bolt 54 extends through an adjustment slot 52 formed in base slide member 26 and projects through the adjustment bolt hole 32 which is formed in base body 25. The threaded shaft portion 58 of machine bolt 54 extends into the hexagonal section 40 of adjustment bolt hole 32. A hexagonal nut 60 may be received in the hexagonal recess 40 and is threadably secured to threaded shaft portion 58. A rounded head portion 56 of machine bolt 54 is secured against a lower portion of base slide member 26 which defines recess 48. A washer 62 may be inserted between rounded head 56 and the base slide member 26, as is shown in FIG. 4.

In order to adjust the level of first work piece bearing surface 50 relative to second work piece bearing surface 44, machine bolt 54 is loosened relative to hexagonal nut 60, and the router base slide member 26 is slid to a desired position relative to router base body 25. In order to effect matching sine wave interlocking cuts in the first and second work pieces 20, 22 as is illustrated in FIG. 1, router base body 25 is adjusted relative to base slide member 26 so that the respective levels of bearing surface 50 and bearing surface 44 are separated by a distance equal to one-half the wavelength of router bit 18, as is shown in FIG. 1. In this way, a first cut may be effected on first work piece 20 by supporting the assembly 10 upon first bearing surface 50. Subsequently, a complementary cut may be formed on second work piece 22 by supporting the assembly 10 upon second bearing surface 44 without readjusting the level of router bit 18 relative to router base body 24 between cuts.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. An assembly for cutting matching panel joints which is adapted to be connected to a cutting tool that has a waveform cutting bit which repeats periodically in profile along its length, comprising:
    a base body having a top surface which is adapted to be secured to the cutting tool, and a lower ramped slide surface extending at a first angle with respect to said top surface;
    a slide member having a top ramped bearing surface which contacts said lower ramped slide surface for sliding movement therebetween, and a lower bearing surface adapted for contacting a work piece, said top ramped bearing surface extending at a second angle with respect to said lower bearing surface that is equal to said first angle; and
    means for releasably securing said slide member at a selected position with respect to said base body, whereby the position of said lower bearing surface may be adjusted with respect to the cutting bit.

2. An assembly according to claim 1, wherein said base body includes an access opening defined therein adapted to allow passage of the cutting bit therethrough.

3. An assembly according to claim 1, wherein said base body further includes a bottom bearing surface which is adapted for contacting a work piece, whereby said lower bearing surface is adjustable relative to said bottom bearing surface.

4. An assembly according to claim 3, wherein said base body further comprises sidewall means for helping to retain said slide member on said lower ramped slide surface.

5. An assembly according to claim 1, wherein said securing means comprises a hole defined in said base body, a slot defined in said slide member and elongate fastener means extending through said hole and said slot for biasing said slide member against said base body.

6. An assembly for cutting matching panel joints, comprising:
    a router having a lower surface, a motor, a shaft connected to said motor and an elongated waveform cutting bit connected to rotate with said shaft; said cutting bit having a cutting profile which repeats periodically along its length;
    a base body having a top surface secured to said router lower surface and a lower ramped slide surface extending at a first angle with respect to said top surface;
    a slide member having a top ramped bearing surface which contacts said lower ramped slide surface for sliding movement therebetween, and a lower bearing surface adapted for contacting a work piece, said top ramp bearing surface extending at a second angle with respect to said lower bearing surface that is equal to said first angle; and
    means for releasably securing said slide member at a selected position with respect to said base body, whereby the position of said lower bearing surface may be adjusted with respect to the cutting bit.

7. An assembly according to claim 6, wherein said base body includes an access opening defined therein to allow passage of said cutting bit therethrough.

8. An assembly according to claim 6, wherein said base body further includes a bottom bearing surface which is adapted for contacting a work piece, whereby said lower bearing surface is adjustable relative to said bottom bearing surface.

9. An assembly according to claim 8, wherein said base body further comprises sidewall means for helping to retain said slide member on said lower ramped slide surface.

10. An assembly according to claim 6, wherein said securing means comprises a whole defined inset base body, a slot defined in said slide member an elongate fastener means extending through said hole and said slot for biasing said slide member against said base body.

* * * * *